United States Patent Office 3,598,795
Patented Aug. 10, 1971

3,598,795
PROCESS OF PREPARING POLYMERS OF OLE-
FINICALLY UNSATURATED COMPOUNDS
USING METAL CARBONYLS WITH METAL
HALIDES
Cornelis E. P. V. van den Berg, Geleen, and Adrianus C.
Moerkamp, Born, Netherlands, assignors to Stamicar-
bon N.V., Heerlen, Netherlands
No Drawing. Filed Jan. 3, 1968, Ser. No. 695,327
Claims priority, application Netherlands, Jan. 5, 1967,
6700205
Int. Cl. C08f 1/28, 19/06
U.S. Cl. 260—84.1          14 Claims

ABSTRACT OF THE DISCLOSURE

A process is described for the polymerization of mono-vinylaromatic monomers, with or without conjugated diene co-monomers, using a mixture of a transition metal carbonyl compound and a metal halide such as titanium chlorides as the catalyst. Certain novel random copolymers are also described, resulting from this process.

The present invention relates to a polymerization process of preparing polymers of olefinically unsaturated compounds using a catalyst composition derived from a metal carbonyl compound and a halogen compound.

In the German Auslegeschrift No. 1,051,003 it is stated that a large number of olefinic compounds can be polymerized in processes using catalysts consisting of a metal carbonyl and an inorganic or organic halogen compound. Such olefins include mono-olefins, e.g. ethylene, propylene and isobutylene; diolefins, e.g. butadiene and isoprene; and many other compounds, such as styrene, vinyl chloride, vinylidene chloride, vinyl ethers, vinyl esters, acrylonitrile, tetrafluoro-ethylene, trifluor chloroethylene. Only one of the examples describes the polymerization of styrene, and this reaction is carried out in an aqueous emulsion. The only halogen compounds mentioned as catalyst components in the examples are tetrachloromethane and chlorobenzene.

Further, the German Auslegeschrift No. 1,026,959 states that the catalyst used in the polymerization of the above-mentioned olefinic compounds may be either a substitution or an addition product of the metal carbonyl compound which may, if so desired, be employed in the presence of a halogen compound. Also in the single example of this Auslegeschrift which mentions the polymerization of styrene, in an aqueous emulsion, the catalyst was a mixture of a triphenyl phosphine nickel carbonyl and carbon tetrachloride.

It is also known from the British patent specification No. 1,033,161 that vinyl compounds can be polymerized using a catalyst compound of the carbonyl compound of a transition metal and a covalent halogen compound, e.g. tribromomethane, tetrachloromethane, or trichloroacetic acid.

The object of the present invention is to provide an improved process for the preparation of polymers of vinyl-aromatic hydrocarbons such as styrene, and also of copolymers of one or more such vinylaromatic hydrocarbons and one or more conjugated aliphatic diolefins, such as butadiene and isoprene, especially rubbery copolymers of styrene, butadiene and/or isoprene, consisting to 99–40% by weight, preferably 95–60% by weight, of butadiene and/or isoprene, and to 1–60% by weight, preferably 5–40% by weight, of styrene, the styrene units being distributed at random over the polymer chains, and more than 50%, preferably more than 65% and mostly over 80% of the butadiene units being in the cis 1–4 configuration. In contradistraction to the known styrene-butadiene rubbers, this new SBR shows in the vulcanized condition a high tear strength and a permanent elongation below 8%, e.g. 6% lower still, when vulcanized for 10 minutes at 150° C. by the recipe mentioned in Example 4.

A further object of this invention is to provide a process for the preparation of block copolymers of styrene and butadiene, and/or isoprene, which possess very good elastomeric properties without vulcanization of the polymer chains. The catalyst employed is very active, comparatively inexpensive, and does not in most cases cause any fire hazard.

The catalyst compositions may be obtained by adding together the stated components thereof, or introducing the said components separately or together, into the reaction mixture.

It has now been found according to this invention that monovinylaromatic hydrocarbons can be polymerized, with or without conjugated diolefins, in good yield, with the aid of catalyst compositions derived from certain metal carbonyl compounds and certain metal halides.

The process provided by this invention is particularly characterized by the feature that the polymerization reaction utilizes a catalyst composition derived from a carbonyl compound of a transition metal, and a halide of a metal from the fourth to sixth groups of the Mendeleev Periodic Table.

The monovinylaromatic hydrocarbons that can be used in this invention include monocyclic carbocylic benzenoid compounds, such as, for instance, styrene, α-methyl styrene, vinyl toluene, vinyl xylene, ethyl styrene, isopropyl styrene, and tertiary-butyl styrene, and in which one or more halogen atoms may be substituted for one or more hydrogen atoms of the benzene ring. Styrene is the preferred monomer. In addition, poly-unsaturated vinyl aromatic hydrocarbons may be present in the polymerization medium, e.g. divinyl benzene or hexavinyl benzene, in amounts of e.g., less than 10% by weight, calculated with respect to the total amount of monomers to be polymerized.

The conjugated dienes that may be used include the aliphatic hydrocarbon dienes containing from 4 to 12 carbon atoms, e.g. butadiene, isoprene, 2,3-dimethyl butadiene-1-3, pentadiene-1-3, 2-methyl pentadiene-1-3, 4-methyl pentadiene-1-3, hexadiene-1-3, hexadiene-2-4, octadiene-2-4, decadiene-1-3, decadiene-3-5, undecadiene-1-3, cyclo-pentadiene-1-3, cyclohexadiene-1-3, cyclo-octadiene-1-3, such compounds as heptatriene-1,3,6, octatriene-1,3,7, cyclo-octatriene-1,3,6, cyclo-octatriene-1,3,7. If desired, the corresponding halogen substituted dienes, for instance chloroprene, may be employed in lieu of the hydrocarbon. Mixtures of conjugated dienes may also be used.

Suitable transition metal carbonyl compounds are, for instance, nickel carbonyl phosphorus trifluoride, nickel carbonyl triphenyl phosphine, dicobalt octacarbonyl, tetracobalt dodecacarbonyl, cobalt carbonyl hydrogen, iron pentacarbonyl, chromium hexacarbonyl, tungsten hexacarbonyl, molybdenium carbonyl, dimanganese decacarbonyl, ruthenium pentacarbonyl, osmium pentacarbonyl, dirhodium octacarbonyl, diiridium octacarbonyl. Mixtures of such metal carbonyl compounds may, of course, also be used. By preference, a carbonyl compound of a metal belonging to the eighth group of the Periodic System is used, in particular, carbonyl compounds of iron, cobalt and/or nickel. Most preferably nickel tetracarbonyl is used, especially in the preparation of copolymers of styrene and butadiene and/or isoprene, because this compound yields a very good catalyst for the process and which is relatively inexpensive.

Suitable halides of metals of the fourth to sixth groups of the Mendeleev Periodic Table include such compounds as the titanium halides, e.g. titanium tetrabromide, titanium tetraiodide, and titanium trichloride, and zirconium tetrachloride, tin tetrachloride, vanadium pentachloride, vanadium oxychloride, antimony tetrachloride, chromium oxychloride, and the corresponding compounds in which, if so desired, one or more halogen atoms may have been replaced by one or more hydrogen atoms, hydroxy groups or alkoxy groups with, say, 1-12 carbon atoms, for instance titanium alkoxyhalides, titanium hydroxyhalides. By preference a titanium chloride is used, in particular titanium tetrachloride.

The relative proportion in which the various catalyst components are used may be varied within wide limits. In general, the molar ratio between the carbonyl compound and the halide may be between about 35:1 and 1:35. Use of higher or lower ratios is possible, but does not present any further advantages. For economic reasons, the ratio between the catalyst components will usually be more nearly equimolecular, e.g., between about 10:1 and 1:10, and preferably somewhere between about 2:1 and 1:8, more in particular a ratio between 1:1 and 1:6.

The concentration of the catalyst may also be varied within wide limits. The term "concentration of the catalyst" is to be understood as denoting herein the sum of the concentrations of the metal-containing catalyst components. In general this concentration will be between about 100 and 0.002 millimols per liter of reaction medium. If the concentration is very low, care must be taken to insure that impurities contained in the starting materials do not deactivate the catalyst.

In general, the liquid organic reaction medium which is used by preference, may be constituted by liquid or liquified hydrocarbons, for instance, ethane, propane, butane, pentane, hexane, heptane, or other mineral oil fractions, for instance kerosine; cyclohexane, isopropyl cyclohexane; aromatic hydrocarbons, e.g. benzene, toluene and xylene, or halogenated aliphatic, cyclo-aliphatic or aromatic hydrocarbons, e.g. tetrachloroethylene, methyl chloride, and chlorobenzene. Mixtures of the abovementioned compounds may also be employed. Preferably heptane, or a gasoline fraction largely consisting of heptane; benzene or toluene is used. However, for the removal of the heat of polymerization use may be made advantageously of low-boiling liquids, e.g. pentane. In addition to, or preferably instead of, the above-mentioned solvents, one or more of the monomers in the liquid state may be used as reaction medium, such as butadiene, and/or styrene, or one of the other unsaturated hydrocarbons. The liquid organic reaction medium is substantially waterfree so that no more water is present than corresponds to about 300 moles percent with respect to the amount of catalyst.

According to the invention, the polymerization may be carried out at temperatures between about $-100°$ C. and $+50°$ C., preferably between about $-80°$ C. and $+30°$ C.

The reaction pressure is not critical. The process may be carried out at virtually atmospheric pressure, or at higher pressures, for instance 1, 2, 4, 10, 20 atm. or higher still. The polymerization may also be carried out at lower pressures, e.g. $\frac{3}{4}$, $\frac{1}{2}$, $\frac{1}{4}$, or $\frac{1}{10}$ atm.

The homopolymers or copolymers obtained according to this invention are excellently suited as elastomeric or thermoplastic materials.

In the preparation of copolymers incorporating a conjugated diolefine, the carbon monoxide to be formed from the carbonyl compound used as a catalyst component must be removed, and taken away such that the released carbon monoxide is prevented from recombining with the transition metal. The formation of carbon monoxide from the carbonyl compound applied is effected in the presence of a hydrocarbon—halogenated, if so desired—having one or more double carbon-carbon bonds, for instance monoolefines such as ethylene, propylene, butylene, isobutylene, 3-methyl butylene, dodecene, styrene, cyclopentene; diolefines such as butadiene and isoprene or compounds having one or more triple carbon-carbon bonds, for instance acetylene, phenyl acetylene or diphenyl acetylene. A simple way of removing the carbon monoxide is by the continuous or discontinuous purging of the space in which the carbon monoxide is formed with an inert gas or vapor. A gas such as nitrogen, hydrogen or hydrocarbons, such as methane, may be used for this purpose. If the formation of the carbon monoxide during the polymerization takes place in the presence of easily vaporized liquid monomer(s), it may be advantageous to evaporate part of the monomer(s) with the purge gas stream. The gaseous monomer(s) can then be recycled to the reaction space after having been stripped from the carbon monoxide and purge gas. The carbon monoxide may also be removed by chemical or physical bonding, and chemical conversion. It is not necessary, however, to remove all of the carbon monoxide formed; however, if a high rate of polymerization is desired the catalyst should be maintained as active as possible, and, hence the carbon monoxide formed should be removed as much as possible.

In the copolymerization of e.g. styrene and butadiene and/or isoprene, use is made by preference of a catalyst consisting of nickel tetracarbonyl and a titanium tetrahalide, in particular of titanium tetrachloride. A particular feature of this catalyst is that it effects copolymerization of the monomers at substantially equal rates, so that there is no need for an excess of styrene, which distinguishes this process from known processes which do work with large excess amounts of styrene. The above feature may considerably simplify the accurate control of the product properties and of the polymerization e.g. in the mass polymerization of the monomers to substantially full conversion.

This invention also particularly provides a method for making block copolymers consisting of a succession of a polymer block of one or more monovinylaromatic hydrocarbons, e.g. a styrene block (block S), a polymer block of one or more conjugated diolefins (block B), and, as the third block, another polymer block of one or more monovinylaromatic hydrocarbons (block S'). The blocks S and S' need not be identical; they may differ for instance in the number of monomers, components or in the molecular weight. Block B, which is preferably composed of butadiene and/or isoprene, may have a very high stereospecificity, viz. a cis 1-4 content of, say, over 80%, in most cases over 90%. The resulting thermoplastic block copolymers, which may or may not be hydrogenated in whole or in part in a conventional manner, possess of themselves elastomeric properties, without being vulcanized.

In the preparation of the block copolymers it is customary to first polymerize styrene and subsequently, without adding a catalyst, to polymerize a conjugated diolefin. In the last-obtained block, styrene may also be incorporated. The third block (block S') can be obtained by polymerizing styrene onto block B without adding a catalyst; however, it is also possible to so treat the product consisting of the blocks S and B with a suitable catalyst that two block copolymer chains are coupled, which results in the formation of a block copolymer consisting of blocks S, B, B, and S, in that order. If the coupling approved is followed, the chain length of block B will usually be twice as small as when there is no coupling. Suitable catalysts for use in this coupling technique are, for instance, Lewis acids, the catalysts described hereinabove, and Ziegler catalysts, for instance those which can be obtained by adding, say, aluminium alkyls to the metal halide, in particular titanium halide, present in the block copolymer. Preferably, the coupling reaction is effected in the absence of the monomer or monomers.

Usually, the mean molecular weight of the blocks S and S is between 5,000 and 35,000, and the mean molecular weight of block B between 20,000 and 200,000, depending on the application of the block copolymers to be prepared.

The preparation of the polymers can be carried out in a continuous as well as in a discontinuous process, and if so desired in more than one stage. Neither the temperatures, nor the residence times in the various stages need be equal, and both these factors may be varied to suit particular needs and desires. It is possible to isolate in the usual way the homopolymers, copolymers or block copolymers, for instance by precipitation by means of addition of or to liquids in which the polymer is less soluble, in the added presence of surface-active substances, if so desired.

Many different substances may be added, to the resulting homopolymers, copolymers or block copolymers—if so desired in the dissolved state. For instance, additives include metals, such as iron, copper, aluminium; fillers, such as chalk, clay, carbon black; so-called tackifiers; so-called extender oils; pigments and dyestuffs; UV stabilizers and anti-oxidants, and polymers, such as polyethylene, polypropylene, polyvinyl chloride, or polystyrene, styrene-acrylonitrile copolymers or low-molecular-weight polymers of, e.g., butadiene. Rubbery copolymers of styrene and butadiene and/or isoprene prepared according to the invention may be mixed in a very simple way with other rubbers, e.g., polybutadiene, especially cis 1-4 polybutadiene prepared in a solution, viz., mixing the two rubbers in the dissolved state.

For special purposes it may be desirable to vulcanize the resulting thermoplastic, elastomeric block copolymers at temperatures below 250° C., preferably at temperatures between 100 and 170° C., however, this vulcanization is not essential. It is also possible to add sources of free radicals. The rubbery random styrene-butadiene copolymers can be vulcanized in a simple way by applying the vulcanization recipes and conditions normally used.

The polymers obtained according to the invention can, if so desired, be given the form of a powder, a granulate, a crumby mass, a sheet, a strand, or a bale, and are useful to form, e.g. shaped objects.

The following examples are intended to elucidate the invention without restricting it. The specific viscosity characteristics are measured on a solution of 0.5 g. of polymer in 100 cu. cm. of benzene at 20° C. The tear strength is measured according to NEN 5603; the permanent elongation according to NEN 5606.

EXAMPLE 1

Homopolymerization of styrene

Into a dried polymerization reactor equipped with a thermometer, a gas inlet tube and a reflux cooler, 765 parts by weight of gasoline, 790 parts by weight of styrene, 1 part by weight of nickel tetracarbonyl, and 2.2 parts by weight of titanium tetrachloride were introduced with stirring and with exclusion of air. The temperature of the polymerization liquid was kept at about 20% C. by cooling.

After 40 minutes, the polymerization was stopped by pouring the reactor liquid into methanol. The precipitated polystyrene was then filtered off, washed and dried. The amount of polymer obtained was 370 parts by weight.

If the polymerization process was made to last two hours, 530 parts by weight of solid polymer resulted. The specific viscosity was 0.1.

EXAMPLE 2

Homopolymerization of styrene

Example 1 was repeated, with this difference that use was made of 250 parts by weight of gasoline and 160 parts by weight of styrene. After a polymerization time of 1 hour, 92% of the styrene had been polymerized. The specific viscosity of the solid polymer was 0.4.

EXAMPLE 3

Homopolymerization of styrene

Example 1 was repeated, with this difference that now 282 parts by weight of gasoline was used as a solvent. The polymerization temperature went up from −25° C. to +27° C. After a polymerization time of 20 minutes 400 parts by weight of solid polystyrene was obtained.

EXAMPLE 4

Homopolymerization of styrene

The polymerization process of Example 2 was repeated except that the catalyst was this time composed of iron pentacarbonyl and titanium tetrabromide.

EXAMPLE 5

Random copolymerization of styrene and butadiene

In the apparatus described in Example 1, 0.085 part by weight of nickel tetracarbonyl and 0.475 part by weight of titanium tetrachloride were added to a mixture of 120 parts by weight of butadiene, 30 parts by weight of styrene and 6 parts by weight of divinyl benzene. Throughout the polymerization the temperature was maintained at 0° C. The reactor was continuously during the polymerization flushed with a dry stream of nitrogen. When a highly viscous solution had been obtained, fresh butadiene, styrene and divinyl benzene were added, in the weight proportion mentioned above. After the solution had again become very viscous owing to the progressing copolymerization, the polymerization was stopped with the aid of methanol. The resulting random copolymer consisting to 19% by weight of styrene was obtained in a yield of 56 parts by weight. An examination showed all of the styrene in the copolymer to be randomly distributed over the polymer chains. The cis 1–4 content of the butadiene units was shown by normal infra-red measurements to be over 80%. The Mooney-viscosity (ML 4′-100° C.) was 40.

After the product had been subjected to vulcanization at 150° C. for 10 minutes, for which the following receipe was used:

Composition A

| | Parts by wt. |
|---|---|
| Copolymer | 100 |
| Zinc oxide | 3 |
| Stearic acid | 2 |
| Carbon black | 50 |
| Extender oil | 15 |
| Accelerator (N - cyclohexyl-2-benz-thiazole-sulphenamide) | 1 |
| Sulphur | 1.75 | it proved to have the following properties:

| Composition | A | B |
|---|---|---|
| Modulus of elongation, 300% (kg./cm.²) | 83 | 34 |
| Hardness (Shore A) | 63 | 54 |
| Tear strength (kg./cm.²) | 92 | |
| Permanent elongation, percent | 6 | 11 |

For comparison, a styrene-butadiene copolymer obtained by emulsion polymerization (ML 4′-100° C.: 54; 23.5% by weight of styrene, cis 1–4 content of the butadiene units: 8%) was vulcanized by the same recipe and under the same conditions (composition B). This proved much poorer than the copolymer obtained according to the invention, as regards modulus of elongation and permanent elongation.

EXAMPLE 6

Random copolymerization of styrene and butadiene

Example 5 was repeated, however without the use of divinyl benzene. After the polymerization mixture had been processed, an amount of 54 parts by weight of polymer was obtained which consisted to 20% by weight of styrene. All the styrene units proved to be randomly distributed over the polymer chains. The cis 1–4 content of the butadiene units was over 80%. The Mooney viscosity (ML 4'–100° C.) amounted to 56. The product was subjected to the same vulcanization as described in Example 4 (recipe, temperature and time) and thereafter proved to have the following properties (composition C):

| Composition | C | D |
|---|---|---|
| odulus of elongation, 300% (kg./cm.$^2$) | 91 | 61 |
| Hardness (Shore A) | 65 | 67 |
| Tear strength (kg./cm.$^2$) | 86 | 65 |
| Permanent elongation, percent | 6 | 35 |

For comparison a styrene-butadiene copolymer (ML 4'–100° C.:56; 25% by weight of styrene; cis 1–4 content of the butadiene units: 32%) obtained by solution polymerization with the aid of a known lithium based catalyst was vulcanized by the same recipe and under the same conditions (composition D). The permanent elongation and the modulus of elongation proved much poorer than in the copolymer obtained according to the invention. Also the tear strength was on a lower level in the known copolymer.

EXAMPLE 7

Block copolymerization of styrene and butadiene

Example 5 was repeated, this time with 190 parts by weight of gasoline and 260 parts by weight of styrene. The temperature of the polymerization liquid was maintained between 0 and −30° C. After a polymerization period of 15 minutes, in which a very viscous polymer paste was formed, 2,000 parts by weight of gasoline saturated with butadiene was fed into the reactor. Thereafter excess butadiene was fed in at about 20° C. for 2 hours. Subsequently, the catalyst was deactivated and washed out, and the polymer was coagulated and dried. The resulting solid polymer contained 47% by weight of styrene and 53% by weight of butadiene. The cis 1–4 content of the butadiene units was over 80%.

The procedure of this example may also be repeated using, as the diene comonomer, an amount of isoprene in place of the butadiene. Copolymers will thus be obtained, having similar properties.

EXAMPLE 8

Block copolymerization of styrene and butadiene

Into a polymerization reactor equipped with a thermometer, a gas inlet tube, a stirrer and a reflux cooler, 190 parts by weight of gasoline, 130 parts by weight of styrene, 2.2 parts by weight of titanium tetrachloride, and 1 part by weight of nickel tetracarbonyl were introduced successively. The reactor was continuously during the polymerization flushed with a dry stream of nitrogen. At a temperature of −20° C. polymerization was effected for ¼ hour. Subsequently 2,000 parts by weight of gasoline saturated with butadiene at 20° C. was fed into the reactor, and polymerization was continued at 25° C., with introduction of excess butadiene. Thereafter, the butadiene was expelled from the stirred vessel by means of nitrogen, and 500 parts by weight of styrene was added to half of the solution; polymerization was then continued for another hour.

The other half of the solution was transferred under nitrogen to another stirred vessel and heated at 80° C. with stirring and nitrogen passage, so as to remove the remaining butadiene. Subsequently, 2 parts by weight of aluminium diisobutyl hydride was added, and stirring was continued for 15 minutes at 80° C.

After the catalyst had been deactivated and washed out and the polymer had been coagulated, the polymers obtained in both cases were elastomeric and returned quickly to their original shape after being elongated to 250% of their original length for 5 minutes. The permanent set was less than 10% of the original length. The cis 1–4 content of the butadiene units was over 80%.

This invention may be practiced in keeping with the procedures of the preceding examples using monomers and catalyst systems other than those specifically illustrated therein. For instance, the monomers and catalyst systems disclosed in the general description of the invention may be used in place of any of those set forth in specific examples. Similarly, variations may be effected in the temperatures and proportions employed, as those skilled in the art will understand from the description and disclosure herein.

Accordingly, the scope of this invention should be understood as limited only by the spirit of the following claims.

What is claimed is:

1. A process for the polymerization of a mixture of at least one vinylaromatic monomer and at least one conjugated diene monomer, said process comprising contacting said monomers at a temperature of between about −100° C. and +50° C. in an organic solvent with a catalyst composition derived from a transition metal carbonyl compound from the eighth group and a halide of a metal from the fourth group of the Mendeleev Periodic Table, and removing during polymerization at least part of the carbon monoxide released from the carbonyl compound, to produce a polymer of said monomers, said polymer having over 50% of conjugated diene units in the cis-1,4-configuration.

2. Process according to claim 1, wherein the polymerization is carried out in a liquid organic reaction medium selected from the group consisting of liquid hydrocarbons, liquified hydrocarbons, halogenated hydrocarbons and mixtures thereof.

3. A process according to claim 1, wherein said monovinylaromatic hydrocarbon is styrene.

4. Process according to claim 1 wherein said polymer has over 80% of conjugated diene units in the cis-1,4-configuration.

5. Process according to claim 1, wherein said carbonyl compound is the carbonyl compound of a metal from the eighth group of the Periodic System.

6. Process according to claim 5, wherein a carbonyl compound selected from a group consisting of iron, cobalt and nickel is used.

7. Process according to claim 6, wherein nickel tetracarbonyl is used.

8. Process according to claim 1, wherein said metallic halide is a titanium halide.

9. Process according to claim 8, wherein said titanium halide is a titanium chloride.

10. Process according to claim 9, wherein said titanium chloride is titanium tetrachloride.

11. Process according to claim 1, wherein the molar ratio between said carbonyl compound and said halide is between 35:1 and 1:35.

12. Process according to claim 1, wherein the concentration of the catalyst is between 100 and 0.002 millimols per liter of reaction medium.

13. Process according to claim 1, wherein said polymerization temperature is between −80° and +30° C.

14. Process according to claim 1, wherein styrene is polymerized in a first stage and a member selected form the group consisting of butadiene and isoprene is copolymerized in a second stage and styrene is copolymerized in a third stage.

References Cited

UNITED STATES PATENTS

| | | | |
|---|---|---|---|
| 3,083,246 | 3/1963 | Holzman | 260—683.15 |
| 3,165,503 | 1/1965 | Kahn | 260—94.3 |
| 3,317,492 | 1/1967 | Hochwalt | 260—79.5 |
| 3,332,917 | 7/1967 | Hsieh | 260—83.7 |
| 3,335,122 | 8/1967 | Trepka | 260—94.2 |

FOREIGN PATENTS

| | | | |
|---|---|---|---|
| 1,120,395 | 7/1968 | Great Britain | 260—84.1 |
| 1,026,959 | 3/1958 | Germany | 260—94.3 |
| 1,377,676 | 9/1964 | France | 260—94.3 |
| 1,458,323 | 10/1966 | France | 260—84.1 |
| 3,717,687 | 10/1962 | Japan | 260—84.1 |

OTHER REFERENCES

Chem. Abst., 55, 2180 i (1961).
Chem. Abst., 59, 8897 d (1963).
Chem. Abst., 63, 4496 g (1965).
Chem. Abst., 64, 2261 c (1966).

JOSEPH L. SCHOFER, Primary Examiner

C. A. HENDERSON, JR., Assistant Examiner

U.S. Cl. X.R.

260—33.6UA, 33.8UA, 41.5R, 79.5B, 80.78, 83.7, 85.3R, 88.2D, 92.3, 93.5S, 94.3, 94.9B, 785, 879, 880B